United States Patent [19]

Dreyer et al.

[11] Patent Number: 5,631,633

[45] Date of Patent: May 20, 1997

[54] DEVICE FOR DETERMINING AND/OR MONITORING A PREDETERMINED MATERIAL LEVEL IN A CONTAINER

[75] Inventors: Volker Dreyer, Lörrach; Bernd Strütt, Steinen, both of Germany

[73] Assignee: Endress + Hauser GmbH + Co., Maulburg, Germany

[21] Appl. No.: 458,796

[22] Filed: Jun. 2, 1995

[30] Foreign Application Priority Data

Jun. 3, 1994 [DE] Germany ............... 44 19 617.2

[51] Int. Cl.$^6$ .................................................. G08B 21/00
[52] U.S. Cl. .................... 340/621; 340/620; 73/290 V; 310/323; 310/328
[58] Field of Search ........................... 340/621, 620, 340/618, 617, 612; 73/290 V; 310/323, 328

[56] References Cited

U.S. PATENT DOCUMENTS

| | | | |
|---|---|---|---|
| 4,400,976 | 8/1983 | Blades | 73/290 V |
| 4,540,981 | 9/1985 | Lapetina et al. | 340/621 |
| 4,594,584 | 6/1986 | Pfeiffer et al. | 340/620 |
| 4,742,244 | 5/1988 | Koerner | 340/620 |
| 4,785,664 | 11/1988 | Reebs | 340/621 |
| 5,062,295 | 11/1991 | Shakkottai et al. | 73/290 V |
| 5,191,316 | 3/1993 | Dreyer | 340/620 |
| 5,408,168 | 4/1995 | Pfadler | 340/620 |

FOREIGN PATENT DOCUMENTS

| | | | |
|---|---|---|---|
| 2553189 | 4/1985 | France | G01F 23/04 |
| 3336991 | 2/1985 | Germany | G01F 23/04 |
| 2090415 | 7/1982 | United Kingdom | 340/620 |
| 2254429 | 10/1992 | United Kingdom | 73/290 V |

*Primary Examiner*—Brent A. Swarthout
*Assistant Examiner*—Van T. Trieu
*Attorney, Agent, or Firm*—Bose McKinney & Evans

[57] ABSTRACT

The determination and/or monitoring of a predetermined material level in a container is effected with the help of a material level sensor which contains a mechanical oscillatory structure, an electromechanical excitation transducer and two electromechanical reception transducers. The mechanical oscillatory structure is secured at the height of the predetermined material level in such a way that it comes into contact with the material when said material reaches the predetermined material level. Each reception transducer is connected to the input of an assigned circuit channel, which contains an amplifier circuit, the output of which is connected to the excitation transducer and which is so constructed that the mechanical oscillatory structure is excited to produce oscillations with its natural resonance frequency. The two circuit channels are activated alternately by means of a control circuit. Furthermore, each circuit channel contains a measuring signal transducer which produces a measuring signal which on the one hand contains the information about the frequency of the output signal of the amplifier circuit, and to which on the other hand an identifier assigned to the circuit channel has been added, said identifier being different from the identifier assigned to the other circuit channel.

4 Claims, 2 Drawing Sheets

5,631,633

DEVICE FOR DETERMINING AND/OR MONITORING A PREDETERMINED MATERIAL LEVEL IN A CONTAINER

FIELD OF INVENTION

The invention relates to a device for determining and/or monitoring a predetermined material level in a container.

BACKGROUND OF THE INVENTION

For determining and/or monitoring a predetermined material level in a container, a material level sensor is used which contains a mechanical oscillatory structure that is mounted at the height of the predetermined material level in such a way that it comes into contact with the material when said material reaches the predetermined material level. The mechanical oscillatory structure is excited to oscillations with its natural resonance frequency. When the oscillating structure oscillates in air, it has a higher natural resonance frequency than when it is in contact with the material. This phenomenon is used for determining and/or monitoring the predetermined material level. An evaluation device compares the instantaneous frequency of the output signal of the amplifier circuit, which is always identical to the current natural resonance frequency of the mechanical oscillatory structure, with a nominal frequency, which is identical to the natural resonance frequency of the mechanical oscillatory structure when it oscillates in air, and which, for example, is recorded during manufacture or during the installation of the material level sensor. When this instantaneous frequency falls below the nominal frequency by more than a predetermined difference, it is presumed that the mechanical oscillatory structure is in contact with the material, while otherwise it is presumed that the mechanical oscillatory structure is oscillating in air. When a maximum material level is being monitored (overfill protection) the first case means that the material level to be monitored in the container has been reached or exceeded, and the second case means that the material level to be monitored in the container has not yet been reached. When a minimum material level is being monitored, on the other hand, the first case means that the material level to be monitored in the container has not yet been reached, and the second case means that the material level to be monitored in the container has been reached, or that the material has fallen below this level.

DESCRIPTION OF THE PRIOR ART

In a device of this kind disclosed in U.S. Pat. No. 4,594,584, the mechanical oscillatory system of the material level sensor has two oscillatory rods secured to a diaphragm, which is further provided with a transducer system comprising an electromechanical excitation transducer and an electromechanical reception transducer. The reception transducer is connected to the input of a circuit channel which contains an amplifier circuit whose output is connected to the excitation transducer and which is designed so that the mechanical oscillatory structure is excited to produce oscillations with its natural resonance frequency whereby said rods are made to oscillate in opposite directions. The output of the amplifier circuit is further connected to an evaluation device for initiating display and switching operations in accordance with the frequency of the output signal of the amplifier circuit. The evaluation device can also detect certain faults in the material level monitoring device from the frequency determined by it. A measured frequency of zero indicates a complete failure of the device. If the measured frequency is substantially higher than the nominal frequency, there is a suspicion that the oscillatory rods have been shortened through corrosion or breakage. In such cases the evaluation device can give an alarm signal; monitoring of the material level is, however, no longer possible until the fault has been rectified.

OBJECTS AND SUMMARY OF THE INVENTION

In dealing with liquid hazardous goods in storage tanks (e.g. liquid gas), the public and Safety Standards Authorities are increasingly calling for self-monitoring overfill protection devices with increased intrinsic safety which still allow the material level to be monitored even after a fault has occurred.

In order to meet this requirement, the invention provides a device for determining and/or monitoring a predetermined material level in a container, comprising:

- a material level sensor which contains a mechanical oscillatory structure, an electromechanical excitation transducer and at least one electromechanical reception transducer, the mechanical oscillatory structure being secured at the height of the predetermined material level in such a way that it comes into contact with the material when said material reaches the predetermined material level;
- a first and a second circuit channel, each of which contains an amplifier circuit whose input is connected to said reception transducer and whose output is connected to said excitation transducer, said amplifier circuit being designed so that the mechanical oscillatory structure is excited to oscillations with its natural resonance frequency, and each of which circuit channels further contains a measuring signal transducer which receives the output signal of the amplifier circuit of the respective circuit channel and produces a measuring signal containing information about the frequency of said output signal, the measuring signal transducer of each circuit channel being designed in such a way that it adds to the measuring signal an identifier which is assigned to the respective circuit channel and which is different from the identifier assigned to the other circuit channel;
- a control circuit for activating the two circuit channels alternately; and
- an evaluation device which receives the output signals of the measuring signal transducers of said two circuit channels for initiating display and/or switching operations in accordance with the frequency of the output signal of the amplifier circuit of said circuit channel and for detecting faults in the operation of the device with the help of the identifiers contained in said output signals.

In the device according to the invention, the evaluation device in normal operation receives the measuring signals alternately from the one and from the other circuit channel; these measuring signals contain the same information about the frequency to be monitored and only differ from each other with regard to the identifier of the circuit channel from which the measuring signal just received originates. With the help of the identifiers, the evaluation device can at all times check that the electronic circuits of the material level sensor are in perfect working order, and can gain additional information if faults occur. If, for example, there is a failure in one of the two circuit channels, pauses occur in the measuring signals transmitted, and from the measuring signals that are still transmitted the evaluation device can detect from the identifier which of the two circuit channels has broken down. If, on the other hand, measuring signals are transmitted continuously, but the identifier remains unchanged, the evaluation device detects that the regular alternation between the two circuit channels is no longer taking place. In each such case of malfunction, the evaluation device triggers an alarm so that the fault can be rectified, however it can meanwhile continue monitoring the material level as long as it still receives measuring signals from one of the two circuit channels.

Further features and advantages of the invention are shown in the following description of an example of embodiment shown in the drawings.

DETAILED DESCRIPTION OF THE INVENTION

Figure 1:
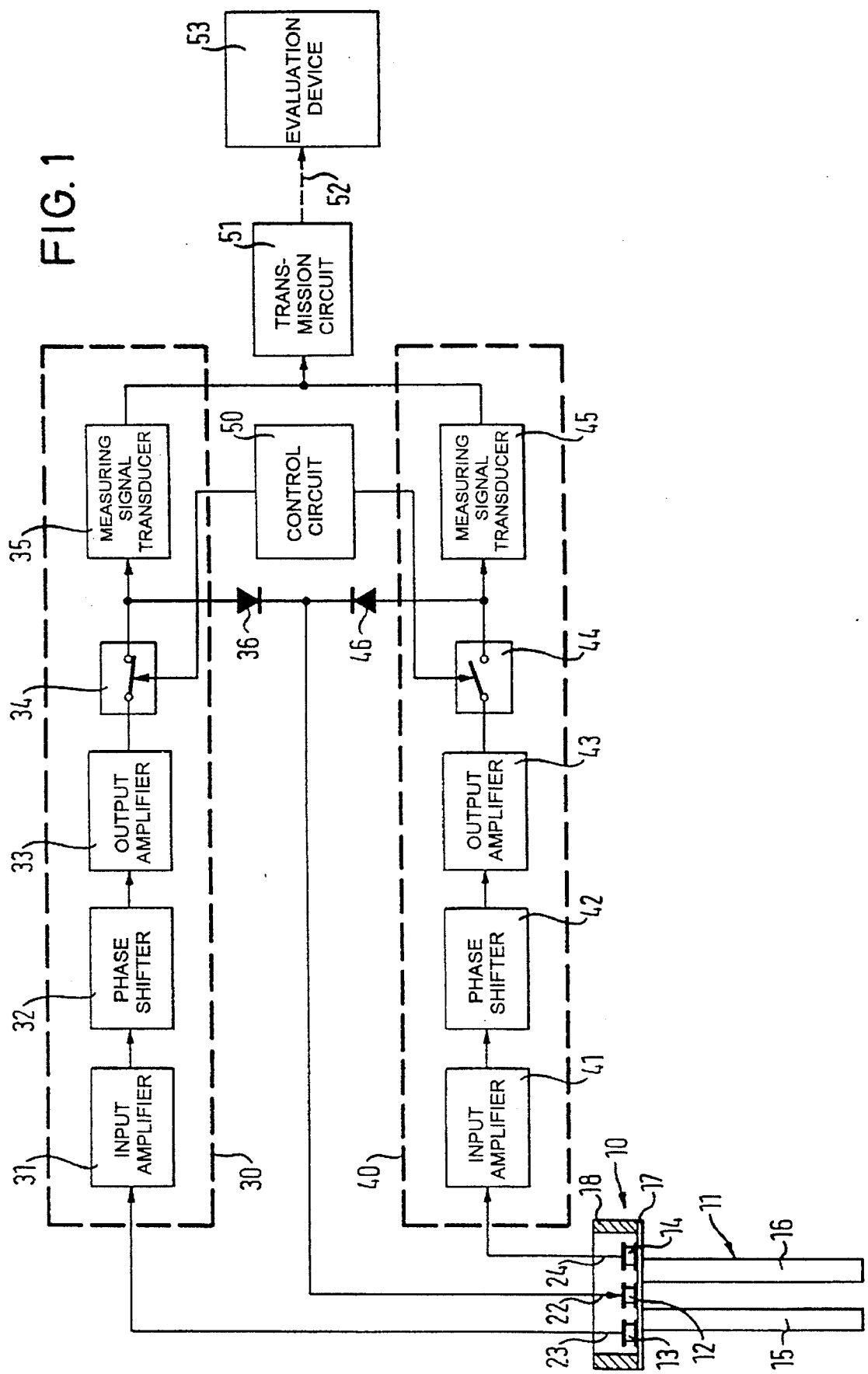
FIG. 1 shows the block diagram of a device according to the invention for determining and/or monitoring a predetermined material level in a container.

FIG. 1 of the drawing shows a material level sensor 10 with a mechanical oscillatory structure 11, an electromechanical excitation transducer 12 and two electromechanical reception transducers 13 and 14. The mechanical oscillatory structure 11 in the example shown consists of two oscillatory rods 15 and 16, each of which is secured at one end to a common diaphragm 17, which around the edge of its circumference is connected to a ring-shaped screw-in part 18. The electromechanical excitation transducer 12 is so designed that that it can convert an applied electric alternating signal (alternating voltage or alternating current) into a mechanical oscillation, and each of the two electromechanical reception transducers 13 and 14 is so designed that it can convert a mechanical oscillation acting on it into an electric alternating signal. As an example it is presumed that each transducer 12, 13, 14 is a piezoelectric transducer containing at least one piezoelectric element. It is known that such a piezoelectric element consists of a disk-shaped piezoelectric crystal arranged between two electrodes. The thickness of the piezoelectric crystal changes depending on the voltage applied to the electrodes, and conversely mechanically constrained changes in thickness produce an electric voltage at the electrodes. The excitation transducer 12 is connected to the diaphragm 17 in such a way that, owing to the oscillations in thickness of its piezoelectric crystal produced by applying an electric alternating voltage, it causes the diaphragm to oscillate; these oscillations are transmitted to the two oscillatory rods, so that these oscillatory rods produce mechanical oscillations in opposite directions transversely to the longitudinal direction of the said rods. Each reception transducer 13, 14 is connected to the diaphragm 17 in such a way that owing to the mechanical oscillations of the diaphragm and of the oscillatory rods an electric alternating voltage is produced between its two electrodes.

One electrode each of each of the three transducers 12, 13 and 14 is connected to a ground connection, which may for example be represented by the diaphragm 17 and the screw-in part 18. The other electrodes form a terminal 22 for the excitation transducer 12, a terminal 23 for the reception transducer 13 and a terminal 24 for the reception transducer 14. The terminal 23 of the reception transducer 13 is connected to the input of a circuit channel 30, which contains an input amplifier 31, a phase shifter 32, an output amplifier 33, a channel switch 34 and a measuring signal transducer 35 mounted in series. The terminal 22 of the excitation transducer 12 is connected to the output of the channel switch 34 via a diode 36. Similarly, the terminal 24 of the reception transducer 14 is connected to the input of one circuit channel 40, which is absolutely identical to circuit channel 30 and thus contains an input amplifier 41, a phase shifter 42, an output amplifier 43, a channel switch 44 and a measuring signal transducer 45 mounted in series, with the terminal 22 of the excitation transducer 12 being connected to the output of the channel switch 44 via a diode 46.

A control circuit 50 applies complementary control signals to the two channel switches 34 and 44, so that channel switch 44 is open when channel switch 34 is closed and vice versa. These control signals are preferably periodical and symmetrical, so that each channel switch is alternately open and closed for the same time. The period of the control signals can be, for example, 1 Hz, so that each channel switch is alternately open for 0.5 s and closed for 0.5 s. Channel switches 34 and 44, which are symbolically represented by mechanical switching contacts, are of course in reality fast electronic switches, which may be constructed, for example, in CMOS technology.

When channel switch 34 is closed, the material level sensor 10 with the two transducers 12 and 13, which are coupled to each other by means of the mechanical oscillatory structure 11, is in the feedback loop of the amplifier circuit of circuit channel 30, said amplifier circuit being formed by circuits 31, 32 and 33. This amplifier circuit is so arranged that the condition for self-excitation is fulfilled, so that the mechanical oscillatory structure 11 is excited to produce oscillations at its natural resonance frequency via the two transducers 12 and 13. If on the other hand the channel switch 44 is closed, the material level sensor 10 with the two transducers 12 and 14, which are coupled to each other via the mechanical oscillatory structure 11, is in the feedback loop of the amplifier circuit of circuit channel 40, said amplifier circuit being formed by circuits 41, 42 and 43. This amplifier circuit is also so arranged that the condition for self-excitation is fulfilled, so that the mechanical oscillatory structure 11 is excited to produce oscillations at its natural resonance frequency via the two transducers 12 and 14.

In order to determine whether the material in a container has reached a predetermined material level, the material level sensor 10 is secured to the container in the known manner in such a way that the two oscillatory rods 15 and 16 come into contact with the material when this has reached the predetermined material level. If the predetermined material level in the container has not been reached, the two oscillatory rods 15 and 16 oscillate in air. In this case, the natural resonance frequency of the mechanical oscillatory structure 11 has a known value, which may be 450 Hz, for example. If on the other hand the two oscillatory rods 15 and 16 come into contact with the material, the natural resonance frequency of the mechanical oscillatory structure falls; it amounts, for example, to approx. 100 Hz for material of high density or high viscosity if both oscillatory rods are completely covered by the material. On the basis of the frequency of the output signal of the output amplifier 33 or 43, which always corresponds to the oscillation frequency of the mechanical oscillatory structure 11, it is possible to determine whether the material in the container has reached the predetermined level or not.

The measuring signal transducer 35, which receives the output signal of the output amplifier 33 when the channel switch 34 is closed, supplies a measuring signal at the output containing the information about the oscillation frequency of the mechanical oscillatory structure 11. A measuring signal containing the same information is supplied by the output of the measuring signal transducer 45 when the channel switch 44 is closed. The outputs of the two measuring signal transducers 35 and 45 are connected to the inputs of a transmission circuit 51, the output of which is connected by means of a cable 52 to an evaluation device 53, which can be positioned in a remote location, while the other circuits shown in FIG. 1 represent the local electronics, which are located on the site of the container the level of which is to be monitored with the help of the material level sensor 10. The evaluation device 53 thus receives the measuring signal produced by the measuring signal transducer 35 when the channel switch 34 is closed, while measuring signal transducer 45 then produces no measuring signal, since channel switch 44 is open and diode 46 prevents the output signal of the output amplifier 33 from reaching the measuring signal transducer 45; on the other hand, the evaluation device 53 receives the measuring signal produced by the measuring signal transducer 45 when the channel switch 44 is closed, while measuring Signal transducer 35 then produces no measuring signal, since channel switch 34 is open, and diode 36 prevents the out-put signal of the output amplifier 43 from reaching the measuring signal transducer 35. The evaluation device 53 can determine the oscillation frequency of the mechanical oscillatory structure 11 from each measuring signal received, and can thus determine whether the material level to be monitored in the container has been reached or not.

In accordance with normal practice, the cable 52 is a two-wire cable through which on the one hand the supply current is conducted from the evaluation device 53 to the local electronics located on the site of the material level sensor 10, and through which on the other hand the measuring signals are transmitted from the local electronics to the evaluation device 53. The measuring signal transducers 35 and 45 are therefore so designed that they produce measuring signals which can be superimposed on the supply current transmitted via the cable 52. This can be done in a known manner by the measuring signals being pulses which are modulated with the information concerning the oscillation frequency of the mechanical oscillatory structure 11. The modulation imparted to the pulses is preferably a pulse-frequency modulation (PFM), so that the pulses transmitted via the cable 52 to the evaluation device 53 have a repetition rate which is identical to the oscillation frequency of the mechanical oscillatory structure 11, or which bears a known ratio to this oscillation frequency. The transmission circuit 51 is designed in a known manner so that it superimposes the PFM pulses onto the supply current on the cable 52, and the evaluation device 53 is so designed that it separates the superimposed PFM pulses from the supply current again.

A special feature of the arrangement described here is not only that two identical circuit channels 30 and 40 are provided which are activated alternately by closing the appropriate channel switch 34 or 44, but also that each measuring signal transducer 35 and 45 adds to the measuring signal produced by it an identifier which identifies the circuit channel and which is different from the identifier of the other circuit channel, so that the evaluation device 53 can recognize from which circuit channel the measuring signal being received has come. The diagrams in FIG. 2 show how the identifiers can be designed if the measuring signals are PFM pulses.

Figure 2:
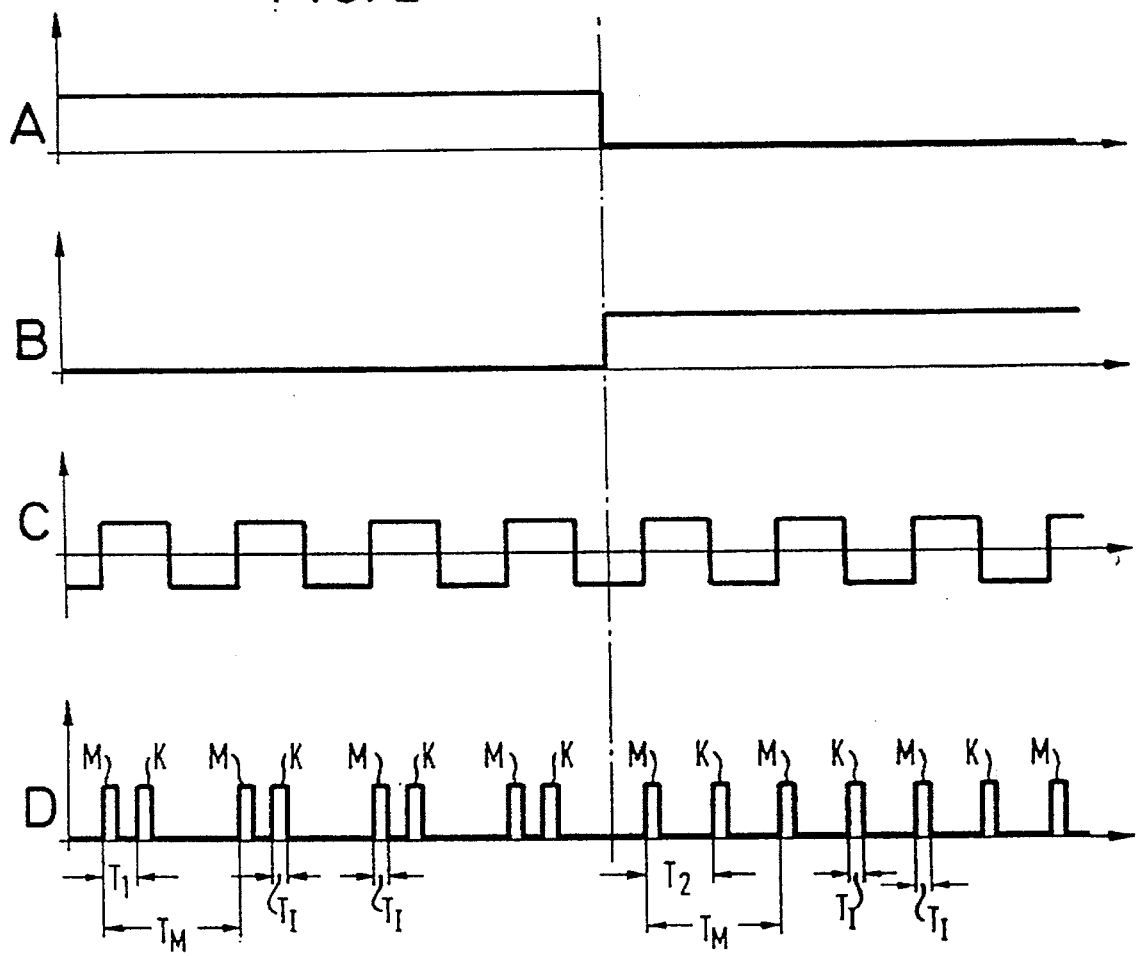
FIG. 2 shows timing diagrams of signals occurring in the device shown in FIG. 1.

Diagram A in FIG. 2 shows the control signal which is applied by the control circuit 50 to the channel switch 34, and diagram B shows the complementary control signal which is applied to channel switch 44. Each channel switch is closed when the control signal applied has a high signal value, and is open when the control signal applied has a low signal value. Thus the diagrams shown in FIG. 2 on the left of the dotted line represent the status in which circuit channel 30 is activated, and the diagrams shown on the right represent the status in which circuit channel 40 is activated.

Diagram C in FIG. 2 shows the output signals of the output amplifiers 33 and 43, each in the activated circuit channel; these output signals are identical. In accordance with normal practice it is assumed that the output amplifiers 33 and 43 are limiter amplifiers, which at the output supply a rectangular-wave voltage, the frequency of which is identical to the oscillation frequency of the mechanical oscillatory structure 11. Each of the measuring signal transducers 35 and 45 produces a short measuring pulse M of duration $T_I$ for each leading edge of the rectangular-wave voltage; the repetition rate of these measuring pulses M is thus identical to the oscillation frequency of the mechanical oscillatory structure 11. In addition, in each period $T_M$ of the measuring pulses M the measuring signal transducer 35 produces a short identifier pulse K, which follows the measuring pulse M at a fixed time interval $T_1$ and preferably is of the same duration $T_I$; in the same way, in each period of the measuring pulses M the measuring signal transducer 45 produces a short identifier pulse K of duration $T_I$, which follows the measuring pulse M at a fixed time interval $T_2$, with interval $T_2$ being different from interval $T_1$. From the intervals $T_1$ and $T_2$ it is thus possible to determine from which circuit channel the measuring signals originate. Interval $T_1$ represents the identifier for circuit channel 30, and interval $T_2$ represents the identifier for circuit channel 40.

The intervals $T_1$ and $T_2$ must of course be shorter than the shortest period $T_M$ which can occur in normal operation of the material level sensor 10; with the natural resonance frequencies mentioned above of the mechanical oscillatory structure 11 of between 100 and 450 Hz, the corresponding periods $T_M$ are between approx. 10,000 and 2,200 μs. The intervals chosen are then for example $T_1$=470 μs and $T_2$=880 μs.

Figure 3:
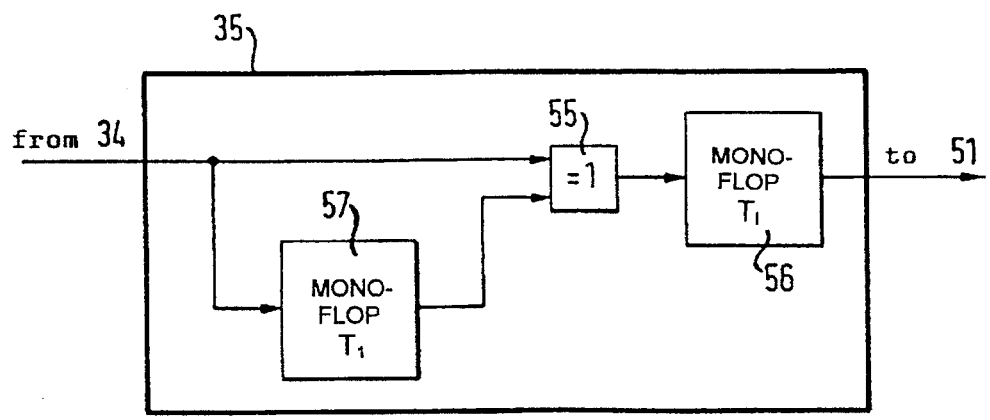
FIG. 3 shows the block diagram of an embodiment of one of the measuring signal transducers in the device shown in FIG. 1.

FIG. 3 shows an embodiment of the measuring signal transducer 35 with which the measuring and identifier pulses mentioned above can be produced. The rectangular-wave signal supplied by the output amplifier 33 and transmitted via the closed channel switch 34 is fed via an exclusive-OR circuit 55 to a monoflop 56, which is triggered by each leading edge of the rectangular-wave signal and which produces a measuring pulse M of duration $T_I$. The same rectangular-wave signal is also fed to a second monoflop 57, the hold time of which is identical to the interval $T_1$ for the identifier of the circuit channel 30. Thus after every triggering operation, the monoflop 57 produces a rectangular-wave signal of duration $T_1$, which is fed to the monoflop 56 via the second input of the exclusive-OR circuit 55, said monoflop being triggered once again by the trailing edge of this rectangular-wave pulse and producing an identifier K of duration $T_I$, which follows the previously produced measuring pulse M at an interval of $T_1$. The measuring signal transducer 45 of the second circuit channel 40 is constructed in the same way, but with the difference that the hold time of the second monoflop is set to interval $T_2$.

The additional identifier pulses have no adverse effects whatsoever on the determination of the oscillation frequency of the mechanical oscillatory structure 11. If the oscillation frequency is determined by counting the pulses of the measuring signals at defined intervals in time, the identifier pulses merely lead to a doubling of the number of pulses for each interval, which can be easily taken into account in the calculation of the oscillation frequency. If on the other hand the oscillation frequency is determined by measuring the repetition period $T_M$ of the measuring pulses, this repetition period can easily be obtained by measuring two successive intervals between pulses and adding these intervals, since one of these intervals is the interval $T_1$ or $T_2$ between a measuring pulse M and the following identifier pulse K, and the other interval is that between an identifier pulse K and the following measuring pulse M.

With the help of the identifiers, the evaluation device 53 can check at all times that the local electronics are in perfect working order and can gain additional information if faults should occur. If for example one of the two circuit channels 30, 40 breaks down, pauses of 0.5 s each occur in the measuring signals transmitted, and from the other measuring signals transmitted the evaluation device 53 can determine from the identifier which of the two circuit channels has broken down. If, on the other hand, measuring signals are transmitted continuously, but the identifier remains unchanged, the evaluation device 53 recognises that the regular alternation between the two circuit channels is no longer taking place, which points in particular to a breakdown in the control circuit 50. In each such case of malfunction, the evaluation device triggers an alarm so that the fault can be rectified, however it can meanwhile continue monitoring the material level as long as it still receives measuring signals from one of the two circuit channels.

It is not absolutely necessary for the mechanical oscillatory structure 11 to contain two reception transducers 13, 14, of which one reception transducer 13 is connected to one circuit channel 30 and the other reception transducer is connected to the other circuit channel 40. In principle the arrangement would also work with a single reception transducer; however, the use of two reception transducers allows improved isolation of the circuit channels from each other.

Similarly, the arrangement described above is not restricted to the use of mechanical oscillatory structures with two oscillatory rods; it can also be equipped with material level sensors which only have one oscillatory rod, or also with material level sensors without oscillatory rods, where only the oscillating diaphragm comes into contact with the material.

The transmission of PFM measuring signals mentioned above represents a preferred technology because the frequency to be measured can be expressed directly through the repetition rate of the PFM pulses and because the PFM pulses can be superimposed particularly easily on the supply direct current on the two-wire cable. This technology is particularly favourable for the invention because it allows the easy insertion of the identifier in the measuring signal in the form of the interval between identifier pulses. Basically, however, the principle described can also be used for other types of measuring signals, provided that an identifier can be added to them to identify the circuit channel.

I claim:

1. A device for determining and/or monitoring a predetermined material level in a container, comprising:

a material level sensor which contains a mechanical oscillatory structure, an electromechanical excitation transducer and at least one electromechanical reception transducer, the mechanical oscillatory structure being secured at the height of the predetermined material level for permitting it to come into contact with the material when said material reaches the predetermined material level;

a first and a second circuit channel, each of which contains an amplifier circuit whose input is connected to said reception transducer and whose output is connected to said excitation transducer, said amplifier circuit being designed so that the mechanical oscillatory structure is excited to oscillations with its natural resonance frequency, and each of which circuit channels further contains a measuring signal transducer which receives the output signal of the amplifier circuit of the respective circuit channel and produces a measuring signal containing information about the frequency of said output signal, the measuring signal transducer of each circuit channel being designed for adding to the measuring signal an identifier which is assigned to the respective circuit channel and which is different from the identifier assigned to the other circuit channel;

a control circuit for activating the two circuit channels alternately; and an evaluation device which receives the output signals of the measuring signal transducers of said two circuit channels for initiating at least one of a display and a switching operation in accordance with the frequency of the output signal of the amplifier circuit of said circuit channel and for detecting faults in the operation of the device with the help of the identifiers contained in said output signals.

2. A device as claimed in claim 1 wherein each circuit channel contains a channel switch and said control circuit alternately opens and closes the channel switches of the two circuit channels.

3. A device as claimed in claim 1 wherein said mechanical oscillatory structure has two reception transducers, of which one reception transducer is connected to the input of the amplifier circuit of said first circuit channel and the other reception transducer is connected to the input of the amplifier circuit of said second circuit channel.

4. A device as claimed in claim 1 wherein each measuring signal transducer produces a pulse-frequency modulated measuring signal consisting of a periodic sequence of short measuring pulses, the repetition rate of which bears a known ratio to the frequency of the output signal of the amplifier circuit, and each measuring signal transducer produces in each period of the measuring signal a short identifier pulse which follows the preceding measuring pulse at a predetermined interval, with the intervals in the two circuit channels being different from each other and representing the identifiers of the circuit channels.

\* \* \* \* \*